US008671058B1

(12) United States Patent
Isaacs

(10) Patent No.: US 8,671,058 B1
(45) Date of Patent: Mar. 11, 2014

(54) METHODS AND SYSTEMS FOR GENERATING COMPLETELY AUTOMATED PUBLIC TESTS TO TELL COMPUTERS AND HUMANS APART (CAPTCHA)

(76) Inventor: Gary Isaacs, Doncaster East (AU)

( * ) Notice: Subject to any disclaimer, the term of this patent is extended or adjusted under 35 U.S.C. 154(b) by 545 days.

(21) Appl. No.: 12/852,509

(22) Filed: Aug. 8, 2010

Related U.S. Application Data

(60) Provisional application No. 61/232,011, filed on Aug. 7, 2009.

(51) Int. Cl.
*G06F 21/00* (2013.01)
*G06K 9/00* (2006.01)

(52) U.S. Cl.
USPC ............................................. 705/50; 382/100

(58) Field of Classification Search
None
See application file for complete search history.

(56) References Cited

U.S. PATENT DOCUMENTS

| | | | |
|---|---|---|---|
| 2003/0045335 A1 * | 3/2003 | Lantz | 463/9 |
| 2003/0233584 A1 | 12/2003 | Douceur | |
| 2004/0199597 A1 | 10/2004 | Libbey et al. | |
| 2008/0049939 A1 | 2/2008 | Canetti et al. | |
| 2008/0127302 A1 | 5/2008 | Qvarfordt et al. | |
| 2008/0182635 A1 * | 7/2008 | Chiu | 463/11 |
| 2008/0320554 A1 | 12/2008 | Baker et al. | |
| 2009/0077170 A1 * | 3/2009 | Milburn et al. | 709/203 |
| 2009/0077171 A1 * | 3/2009 | Kasha | 709/203 |
| 2009/0138723 A1 | 5/2009 | Nyang et al. | |
| 2009/0232351 A1 * | 9/2009 | Kagitani et al. | 382/100 |
| 2010/0306055 A1 * | 12/2010 | Kolb | 705/14.55 |

FOREIGN PATENT DOCUMENTS

WO 2008091675 A1 7/2010

* cited by examiner

*Primary Examiner* — Alexander Kalinowski
*Assistant Examiner* — Murali Dega
(74) *Attorney, Agent, or Firm* — Franklin & Associates International; Matthew F. Lambrinos

(57) ABSTRACT

Methods and Systems for generating a Completely Automated Public Tests to tell Computer and Humans Apart (CAPTCHA) provide a computational puzzle according to a received request. The computational puzzle, which may be for example, a jigsaw puzzle, maze puzzle, composite image of matching and non matching shapes or other type of puzzle, is configured to have a correct solution that is expected to be determinable by a human rather than a computer. For example, the computational puzzle is generated from a plurality of individually randomly generated puzzle features, such as puzzle surface image, image color gradient, puzzle component shape, or other puzzle features. A determination is made as to whether a human as opposed to a machine solved the computational puzzle.

15 Claims, 19 Drawing Sheets

METHODS AND SYSTEMS FOR GENERATING COMPLETELY AUTOMATED PUBLIC TESTS TO TELL COMPUTERS AND HUMANS APART (CAPTCHA)

CROSS REFERENCE TO PROVISIONAL APPLICATION

This application claims priority under 35 USC §119(e) to the U.S provisional patent application No. 61/232,011, entitled "A Method of Generating a Completely Automated Public Test to tell Computers and Humans Apart (CAPTCHA)", which was filed Aug. 7, 2009, the disclosure of which is incorporated herein by reference.

TECHNICAL FIELD

The present invention relates to a method of generating a Completely Automated Public Test to tell Computers and Humans Apart (CAPTCHA), and more particularly to a method that can be used as an entry point to online websites or protected section, pages or links of websites.

BACKGROUND

It has been know to have particular mechanisms to try to stop computers automatically accessing website and downloading information in bulk manner. Such downloads takes substantial access away from other users trying to enter website at the same time. However a further problem is the ready absorption of a database or information that should be protected by Copyright and only used in minimal portions by individuals.

An example of particular mechanisms to stop computers automatically accessing website and downloading information in bulk manner is for example, the RECAPTCHA system illustrated at http://recaptcha.net has been patented according to WO 2008/091675. This can be considered as a first level mechanism given that a user is simply required to repeat what is shown to them on the screen.

Patent documents implementing a graphical problem include US 2009/0138723 which requires the user to view a distorted image and enter keywords identifying objects that appear in front of them US 2004/0199597 and US2008/0320554 the user is required to simply input the distorted words shown to them.

A second level mechanism of visual means could be considered as illustrating a stronger level of effectiveness against breaches of security by different human problem solving skills. This is shown by US 2009/0138723. However the invention disclosed by US 2009/0138723 may be overcome by complex bots undertaking standard computational analysis of light and dark pixels, which may recognize the silhouette of such images.

A third category is required to overcome the disadvantages of the first and second level patent documents.

There have been some attempts at a third level such as US 2008/0127302, which discloses the use of an animation as a security system. The patent document adopts visual problems but such a mechanism does not require the user to actively take part in the de-encryption process. In particular, this US patent document only requires the user to type what is shown to them at a particular point in the animation. It does not require any intuitive level of skills.

US 2008/0049939 discloses the use of visual images in the form of inkblots, personal associations and imaginative inferring problems. An individual is allocated a particular password and problems. There is no right or wrong answer; the user must simply answer consistently. Such a system can be hacked into by relatives or acquaintances of the user knowing the user and likely interpretative answers of the user. Strong intuitive skills are not required as the user is merely required to state what they see. The invention lacks the randomness and the level of security of having only one correct answer.

Therefore the prior art systems are readily determinable in a computational manner. They do not use intuitive human thinking distinctly from computational logical thinking of computers however directly disclose within the document use of graphical problems.

It is known that online games currently include noughts and crosses, chessboards, snakes and ladders etc. Such can have devised computational means of solution. However a computer can only follow particular rules in order to solve. These rules are clearly determinable limitations such that computer solutions are different to human intuitive solutions.

It is an object of the present invention to provide an improved method of generating a Completely Automated Public Test to tell Computers and Humans Apart (CAPTCHA), and more particularly to a method that can be used as an entry point to online websites or protected sections, pages or links of websites that overcomes or at least ameliorates one or more of the problems of the prior art.

SUMMARY

According to one aspect, there is provided a method of generating a Completely Automated Public Test to tell Computer and Humans Apart (CAPTCHA) wherein the nature of the puzzles as requiring a high level of human participation and interpretation. This participation and interpretation is through the use of computational puzzles requiring humans to utilize their conceptual and interpretational skills rather than mimicking what is being seen. In particular it is the use of intuitive thinking that humans undertake rather than simple computational thinking that computers can readily mimic.

An element of providing a method of generating a Completely Automated Public Test to tell Computer and Humans Apart (CAPTCHA) wherein the nature of the puzzles uses intuitive thinking is the use of a puzzle whereby the solution determined by a computer could be different to a solution by a person.

In one particular form the puzzle can be in the form of a maze. Generally the computational method of a computer overcoming a maze problem is to follow the one wall which must eventually proceed to the only opening being a computational means of solution. The computer can only follow particular rules in order to solve. These rules are clearly determinable limitations such that computer solutions are different to human intuitive solutions.

The maze can be developed to create answers that are readily understood and solvable by humans such as by including letters or markers along the way and requesting the markers to be listed in order to show the quickest route out of the maze. The computational method on the other hand could include a longer path and therefore provide the wrong answer.

Another means of providing a difference human solution to the computed solution is to have a maze with a plurality of routes out through a plurality of exits but that only one is a correct answer to being the shortest or the straightest route etc.

The method of generating a Completely Automated Public Test to tell Computer and Humans Apart (CAPTCHA) can include providing a randomly generated puzzle wherein the puzzle is in the form of a graphical, mathematical or ordered problem or combinations thereof and wherein:

1. Input of a user's answer is in numerical or text form or clicking within the puzzle image;
2. The defined puzzle has one correct answer;
3. There is a determination, whereby the answer entered by the user is analyzed according to the correct answer stored for that puzzle;
   a) Whereby if the determinator detects an incorrect answer a new random puzzle appears or an appropriate message is displayed;
   b) Whereby if the determinator detects multiple incorrect answers to a predetermined number, the users IP address is blocked or a more complex puzzle is provided;
   c) And whereby if the determinator detects a correct answer, the user is allowed access.

The method of generating a Completely Automated Public Test to tell Computer and Humans Apart (CAPTCHA) can include providing a randomly generated puzzle wherein the puzzle is in the form of a graphical, mathematical or ordered problem or combinations thereof and wherein:

4. Input of a user's answer is in numerical or text form or clicking within the puzzle image;
5. The defined puzzle has one correct answer;
6. There is a determination, whereby the answer entered by the user is analyzed according to the correct answer stored for that puzzle;
   a) Whereby if the determinator detects an incorrect answer a new random puzzle appears or an appropriate message is displayed;
   b) Whereby if the determinator detects multiple incorrect answers to a predetermined number, the users IP address is blocked or a more complex puzzle is provided;
   c) And whereby if the determinator detects a correct answer, the user is allowed access.

A method of generating a Completely Automated Public Test to tell Computer and Humans Apart (CAPTCHA), comprising the steps of:

a) presenting a user with a randomly generated puzzle; and
b) assuming that the recipient of the Captcha (puzzle) is a human as opposed to a machine if the correct solution to the puzzle as expected to be determinable by human rather than computer is selected.

The method wherein the complexity of the puzzle uses a single test requiring multiple types of simultaneous analysis that can be readily undertaken simultaneously by a human but would require consequential computation by a computer. The answer could be needed to be provided in a defined time in a defined manner in order to show the means of determination and thereby distinguish humans from computers.

The method wherein one or more of the following is used:
c) matching of shapes, matching of colors, counting of shapes, counting of shapes and colors, deduction of graphical problems and puzzles which have a maximum of one solution.

The method wherein one or more of the following is used:
d) matching of shapes, matching of colors, counting of shapes, counting of shapes and colors, deduction of graphical problems and puzzles which have a maximum of one solution.

The method can further including the step of:
e) presenting multiple images to a recipient together with a simply worded puzzle problem to be solved by the user.

The method can include the step of:
f) Presenting the user with a puzzle in one form
g) Requiring an answer in another form.

The method can include a graphical and mathematical problem while the answer can be a diagrammatic locational answer or vice versa. This means the human can intuitively combine the reasoning of the determination of the first problem with the different means of determination and entering of the solution to the first problem.

The method wherein the user is asked a simple question where the words chosen and the requirement is unambiguous and the user is required to:
a) provide an answer in the form of either a numerical or text form; or
b) choose a correct answer from a number of provided options
c) click within the puzzle problem image area to indicate the user's correct answer
d) enter a response—assuming that the recipient of the image is a human as opposed to a machine, if the correct response is selected or answer provided the user is permitted to go the next step.
e) Complete a new puzzle—if an incorrect response is received by the Puzzle Captcha.

The method wherein the user solves the puzzle problem by applying:
a) simple logic to intuitively deduce a result; and
b) simple mathematical calculations to produce a numerical answer.

The Puzzle Captcha system prevents the user from entering multiple answers to the same puzzle problem to avoid the likelihood of a machine arriving at the correct answer through a process of elimination.

The process of inserting incorrect answers to puzzles is repeated; the Puzzle Captcha system may be programmed to block the IP address of the user.

According to another aspect, there is provided a method for generating a Completely Automated Public Test to tell Computer and Humans Apart (CAPTCHA). The method can comprise receiving in a computer system a request to determine if computer user is a human or a machine; generating a customized computational puzzle problem from individually randomly generated puzzle features; rendering the generated computational puzzle problem on a user interface of the computer system; receiving in the computer a user interface entered solution to the rendered computational puzzle problem; accessing, using the computer, a pre-determined correct solution to the rendered computational puzzle problem that is expected to be determinable by a human rather than a computer; comparing, using the computer, the received solution with the pre-determined correct solution; determining from the comparison of the received solution and the pre-determined correct puzzle solution that a human as opposed to a machine generated the user interface entered solution.

According to yet another aspect, there is provided a system for generating a Completely Automated Public Test to tell Computer and Humans Apart (CAPTCHA). The system has a processor; a data bus coupled to the processor; and a computer usable medium embodying computer program code, the computer usable medium being coupled to the data bus. The computer program code can comprise instructions executable by the processor and can be configured to: receive in a computer system a request to determine if computer user is a human or a machine; generate a customized computational puzzle problem from individually randomly generated puzzle features; render the generated computational puzzle problem on a user interface of the computer system; receive in the computer a user interface entered solution to the rendered computational puzzle problem; access, using the computer, a pre-determined correct solution to the rendered computational puzzle problem that is expected to be determinable by a human rather than a computer; compare, using the computer, the received solution with the pre-determined correct solution; determine from the comparison of the received solution and the pre-determined correct puzzle solution that a human as opposed to a machine generated the user interface entered solution.

BRIEF DESCRIPTION OF THE DRAWINGS

In order that the present invention may be more readily understood, reference will now be made to the accompanying drawings, in which.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

The foundation to Puzzle Captcha is the development of a simple puzzle that cannot be learnt or defined by rules or logic. This will prevent a computer from learning to solve Puzzle Captcha.

Puzzle Captcha requires the user to:
1. read and understand a puzzle problem
2. interpret the components of the problem visually
3. formulate a response
4. indicate a response using the system's input The Puzzle Captcha task is typically inserted into a process at a point where it is important to detect if the user is a robot or a real person.

Puzzle Captcha instead of requiring the user to type in a word is required to view, interpret and write. The inclusion of the "interpretation" step into the process is the critical innovation in this proposed improvement to the Captcha process.

Figure 1:
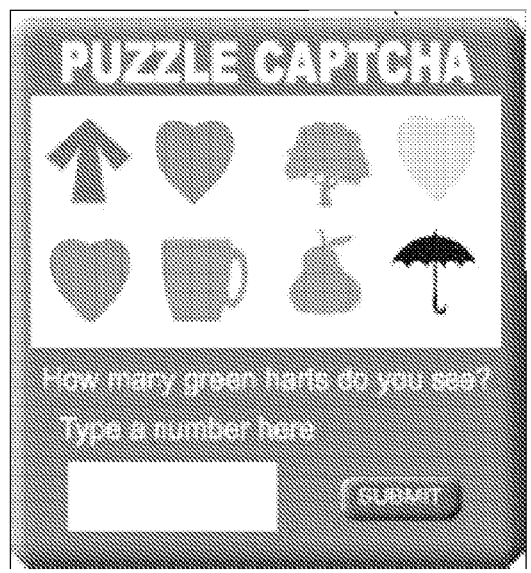
FIG. 1 is a diagrammatic view of a first embodiment of a puzzle for use in the method of generating a Completely Automated Public Test to tell Computer and Humans Apart (CAPTCHA)

In the example shown in FIG. 1 there is a selection not only of shape of an article but also of color. Further there is a requirement for an answer in a different format to the question. Overall there are pluralities of problems that need sequential computational analysis by a computer; however a human is able to intuitively and quickly undertake all three forms of shape analysis, color analysis and arithmetic in one simultaneous action. The Puzzle Captcha 1 appearing in FIG. 1 has the answer of "two". Note that green harts are represented as darker grey harts in FIG. 1.

Figure 2:
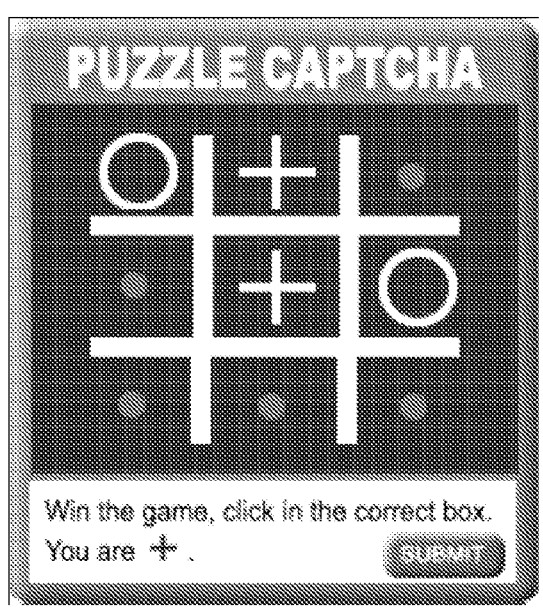
FIG. 2 is a diagrammatic view of a second embodiment of a puzzle.

In another form as shown in FIG. 2 there is a puzzle 2 that again could be solved by computational means over time but can intuitively be answered by a human instantaneously Therefore timing restrictions on results can provide a distinguishing feature of computational determination by a computer and intuitive determination by a human.

Puzzle Captcha is shown to the user prior to a user having access to an important next step in a process where the next step may be prone to abuse by machines using automated systems to post inappropriate information.

Problems of uncontrolled access including the following:
a) Preventing Comment Spam in Blogs
Most bloggers are familiar with programs that submit bogus comments, usually for the purpose of raising search engine ranks of some website (e.g. "buy penny stocks here"). This is call comment Spam. By using a CAPTCHA, only humans can enter comments on a blog. There is no need to make users sign up before they enter a comment, and no legitimate comments are ever lost!
b) Protecting Website Registration
Several companies (Yahoo! Microsoft, etc) offer free email services. Up until a few years ago, most of these services suffered from a specific type of attack: "bots" that would sign up for thousands of email accounts every minute. The solution to this problem was to use CAPTCHAs to ensure that only humans obtain free accounts. In general, free services should be protected with a CAPTCHA in order to prevent abuse by automated scripts.

c) Protecting Email Addresses From Scrapers

Spammers crawl the Web in search of email addresses posted in clear text CAPTCHAS provide an effective mechanism to hide your email address from Web scrapers. The idea is to require users to solve a CAPTCHA before showing you email address. A free and secure implementation that uses CAPTCHAs to obfuscate an email address can be found at reCAPTCA MailHide.

d) Online Polls

In November 1999, http://www.slashdot.org released an online poll asking which was the best graduate school in computer science (a dangerous question to ask over the web!). As is the case with most online polls, IP addresses of voters were recorded in order to prevent single users from voting more than once. However, students at Carnegie Mellon found a way to stuff the ballots using programs that voted for CMU thousands of times. CMU's score started growing rapidly. The next day, students at MIT wrote their own program and the poll became a contest between voting "bots." MIT finished with 21,156 votes, Carnegie Mellon with 21,032 and every other school with less than 1,000. Can he result of any online poll be trusted? Not unless the poll ensures that only humans can vote.

e) Preventing Dictionary Attacks

CAPTCHAs can also be used to prevent dictionary attacks in password systems. The idea is simple: prevent a computer from being able to iterate through the entire space of passwords by requiring it to solve a CAPTCHA after a certain number of unsuccessful logins. This is better than the classic approach of locking an account after a sequence of unsuccessful logins, since doing so allows an attacker to lock accounts at will.

f) Search Engine Bots

It is sometimes desirable to keep web pages unindexed to prevent others from finding them easily. There is an html tag to prevent search engine bots from reading web pages. The tag, however doesn't guarantee that bots won't read a web page; it only serves to say "no bots, please". Search engine bots, since they usually belong to large companies, respect web pages that don't want to allow them in. However, in order to truly guarantee that bots won't enter a web site, CAPTCHAs are needed.

g) Worms and Spam

CAPTCHAs also offer a plausible solution against email worms and Spam: "I will only accept an email if I know there is a human behind the other computer". A few companies are already marketing this idea.

Figure 3:
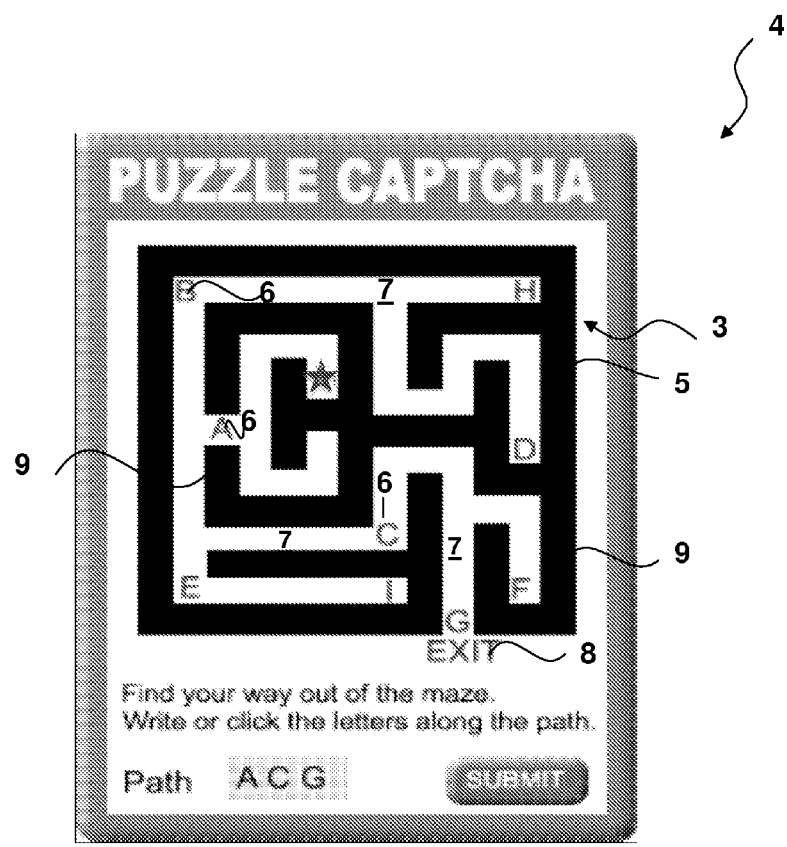
FIG. 3 is a diagrammatic view of a third embodiment of a puzzle.

In a particularly preferred form of an embodiment, there is shown in FIG. 3 a puzzle 3 that is randomly formed by the Puzzle Captcha system 4 in the form of a maze 5. The maze has directional headers A to H 6 along various paths 7 and the user must solve the puzzle quickly for the shortest route to the exit G. The grey star must find the exit. Clearly intuitively the human can quickly determine the answer to be ACG. However for a computer to solve such as a maze 5 it would usually follow computational rules such as follow a sidewall 9 continuously until reaching an exit 8. In this way the computer would assess the exit 8 to be ACFG and therefore be different to the human answer although technically still a correct answer it is not the shortest.

Figure 4:
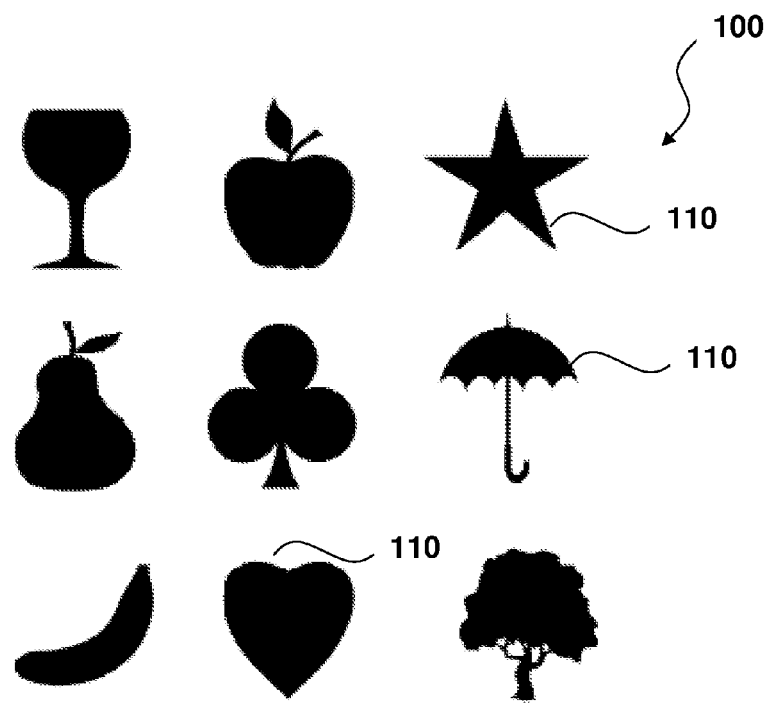
FIG. 4 is a diagrammatic view of a fourth embodiment of a puzzle.
Figure 5:
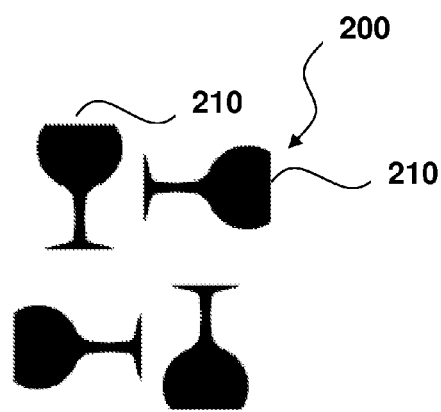
FIG. 5 is a diagrammatic view of a fifth embodiment of a puzzle.
Figure 6:
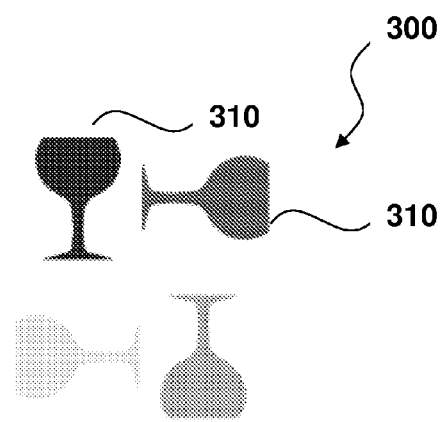
FIG. 6 is a diagrammatic view of a sixth embodiment of a puzzle.
Figure 7:
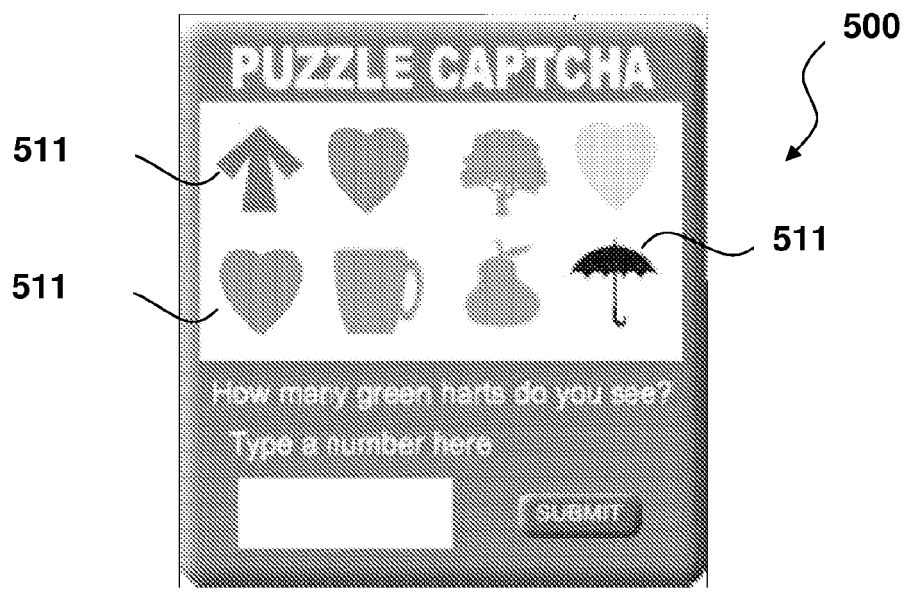
FIG. 7 is a diagrammatic view of a seventh embodiment of a puzzle.
Figure 8:
FIG. 8 is a diagrammatic view of an eighth embodiment of a puzzle.

In other versions of the puzzle Captcha application 100, 200, 300, as shown in FIGS. 4, 5 and 6 the puzzle elements 110, 210, 310 are taken from a library of possible images. The puzzle Captcha library of images may be expanded to include common images that are easily recognized. The orientation of the images is altered to increase the difficulty for a machine to recognize a shape. Each of the Shapes may be varied for color. This participation and interpretation of the correct answer regardless of some features but including others is through the use of computational puzzles requiring humans to utilize their conceptual and interpretational skills rather than mimicking what is being seen. In particular it is the use of intuitive thinking that humans undertake rather than simple computational thinking that computers can readily mimic.

Referring to FIGS. 7 to 10 there are shown puzzle images which are randomly selected by the Puzzle Captcha application. A randomly selected image 511 is repeated in the frame to produce the composite image 500. In this case color is randomly selected to apply to the heart. Green hearts are shown in dark grey in FIGS. 7 to 10. The standard question "How many (color) (puzzle shape) do you see?" has blanks which are replaced by the color of the shape 511 and the name of the puzzle shape. The question is formatted as a graphic when it is shown to the user.

When the user sees the Puzzle Captcha 500 they are able to differentiate between the shapes and make a count of how many shapes 511 are of the same color. In this case there are three hearts, but only two of the three hearts are green. The answer is two (2).

If the users insert an answer other than two (2), the user will fail the test and depending on the situation, the user may be taken to a new screen with an appropriate message or the user may be given a second chance.

If the answer may be entered using the keyboard or the number (or letter) could be chosen from a small group of options. In the following example just five options have been provided (numbers 1 to 5).

Figure 9:
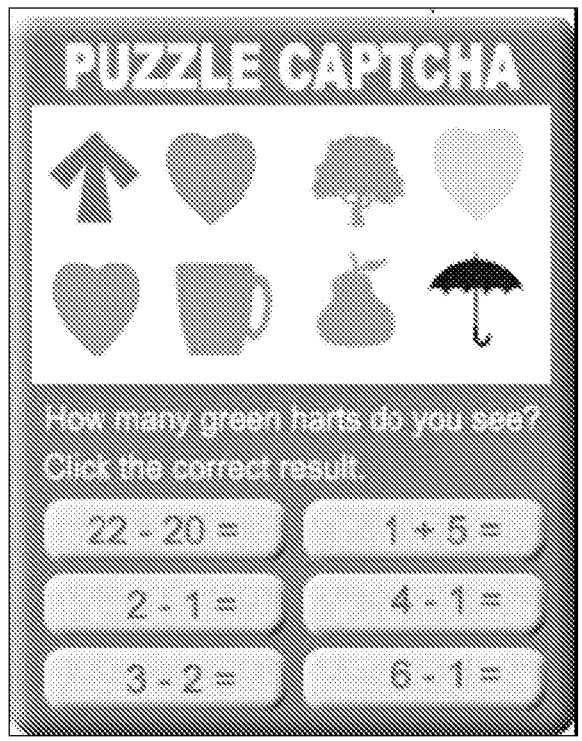
FIG. 9 is a diagrammatic view of a ninth embodiment of a puzzle.
Figure 10:
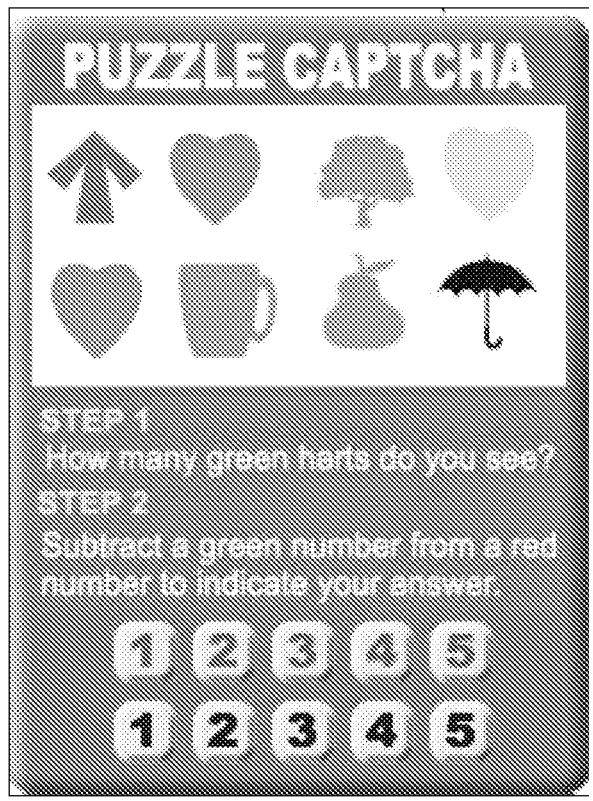
FIG. 10 is a diagrammatic view of a second embodiment of a puzzle.

The user simply clicks on the button number corresponding to the number of green hearts.
1. If the user clicks the incorrect button number, the Puzzle Captcha allows a new puzzle to be solved.
2. After a predetermined number of failed attempts the user's IP address could be blocked and or a more complex puzzle provided.
3. A double puzzle is possible with Puzzle Captcha. A user is first shown the group of images and asked to decide on how many of a certain shape are present.
4. The user must indicate the number by solving a simple problem, as shown in the example of FIG. 9. The user has a 1:6 chance of guessing the correct button. These odds of a user guessing the answer can be increased by using the following Puzzle Captcha option. The odds for the example of FIG. 10 are 1:8.

Figure 11:
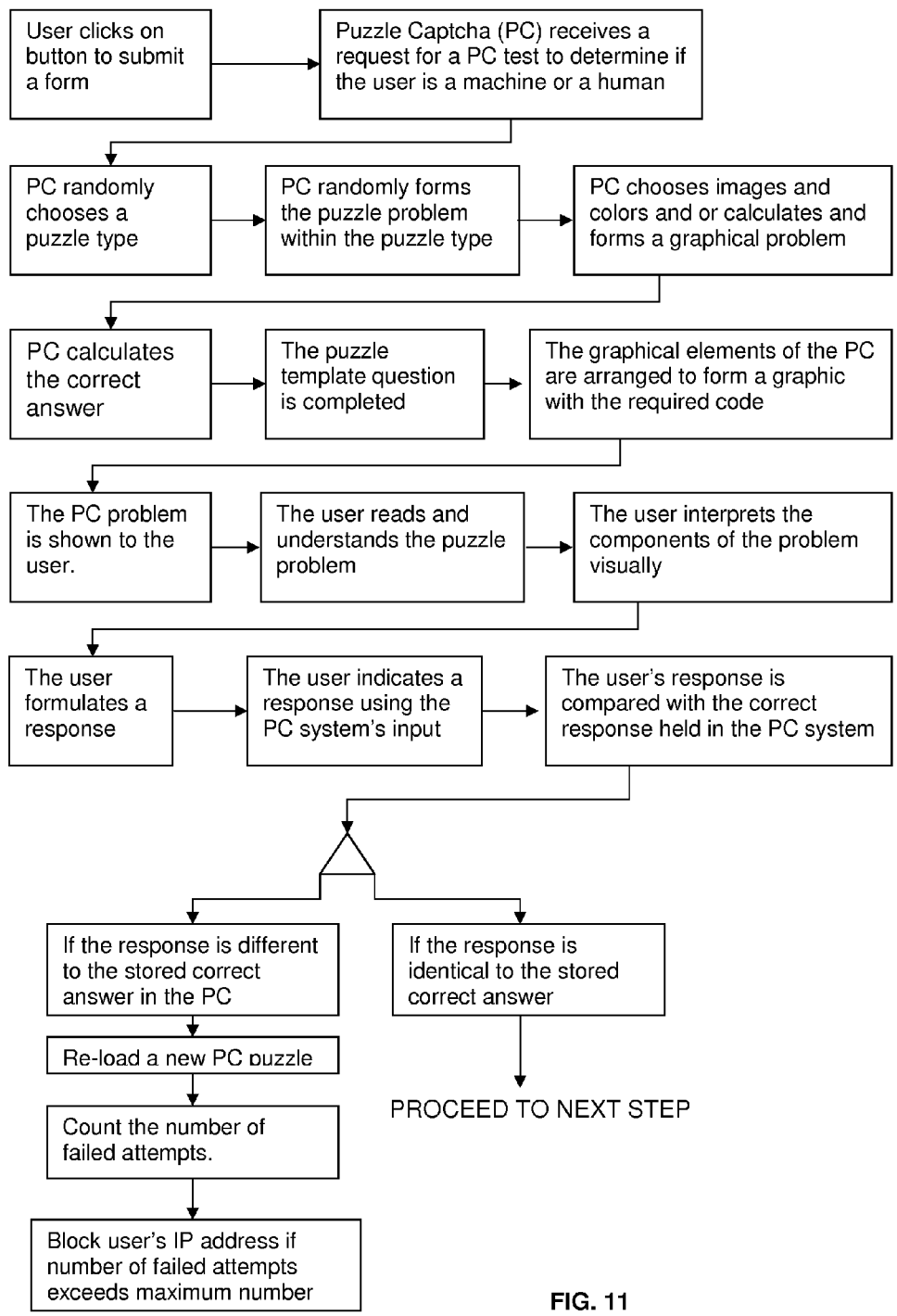
FIG. 11 is a diagrammatic flow diagram of the method of generating a Completely Automated Public Test to tell Computer and Humans Apart (CAPTCHA) according to one embodiment.

Referring to FIG. 11 there is shown a diagrammatic flow diagram of the method of generating a Completely Automated Public Test to tell Computers and Humans Apart (CAPTCHA) according to one embodiment.

Methods and systems for generating Completely Automated Public Test to tell Computer and Humans Apart (CAPTCHA) according to the embodiments described herein can be implemented in any type of computer or data processing environment having a processor and a user interface, operatively connected or connectable to the processor. The processor can be coupled to a computer usable medium embodying computer program code via a data bus. The computer program code comprises instructions executable by the processor and configured to generate a Completely Automated Public Test to tell Computer and Humans Apart (CAPTCHA) according to the embodiments described herein.

Figure 12:
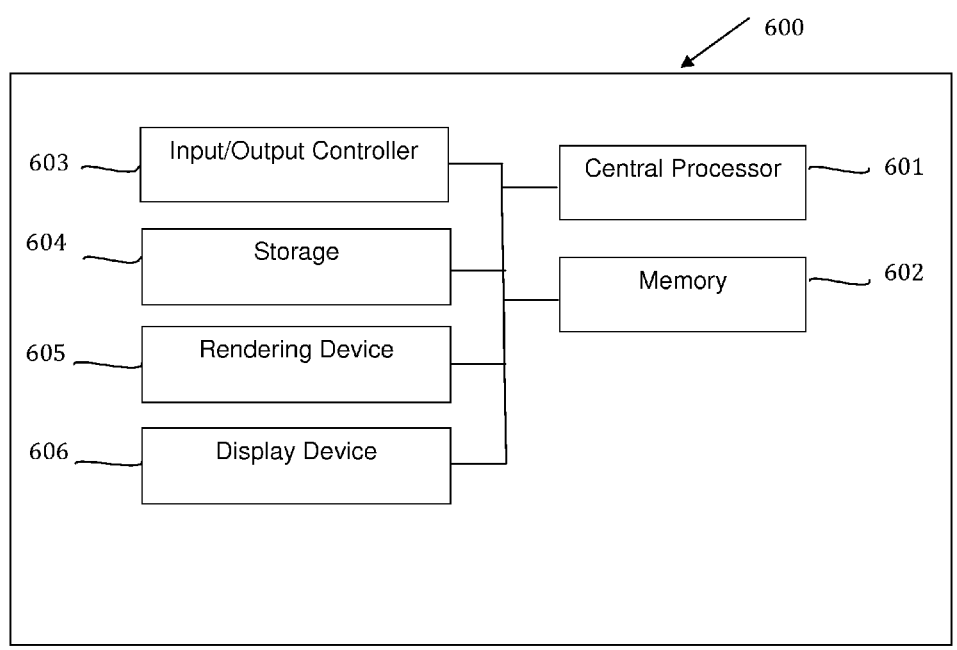
FIG. 12 is schematic of a data processing system for implementing methods of generating a Completely Automated Public Test to tell Computer and Humans Apart (CAPTCHA) according to embodiments.

A non-limiting example of the hardware of a data processing system for implementing methods and systems of the embodiments is illustrated in FIG. 12. System 600 has a central processor 601 operatively coupled to a display device 606. System 600 typically includes memory 602, input/output controller 603, storage 604 for storing puzzle captcha databases, libraries and other information, display device 606 and a rendering device 605 for rendering generated computational puzzles and other data on display device 606.

Processor 601 can be any type or process that is configurable to run the puzzle captcha computer program code. By way of a non-limiting example, the processor can be located in a server, personal computer, pda phone, notebook, tablet phone or other device. The processor can be operatively connected or connectable locally to display device 606 or remotely via any suitable remote or local network. Display device 606 can be any type of display device which is configured to render the puzzle captcha images for a display for viewing by a human user and to receive human entered input selections of a puzzle solution. By way of a non-limiting example the display device can be a device operable on a personal computer, notebook, pda phone, standard phone, tablet device or other device.

Figure 13:
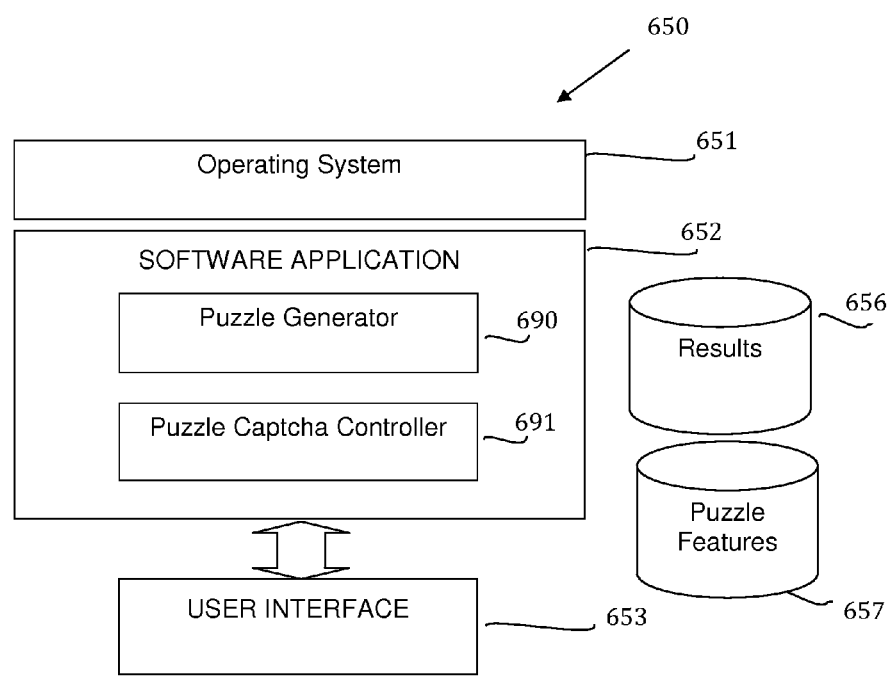
FIG. 13 is a schematic of a software system for implementing methods of generating a Completely Automated Public Test to tell Computer and Humans Apart (CAPTCHA) according to embodiments.

FIG. 13 illustrates a computer software system 650 for directing the operation of the data processing systems of the embodiments. Software system 650, which is stored in system storage/memory 602, 604, can include a kernel or operating system 651 and a shell or interface 653. One or more application programs, such as application software 652, may be "loaded" (i.e., transferred from storage 604 into memory 602) for execution by the processor. The data-processing apparatus 600 receives user commands and data through user interface 653; these inputs may then be acted upon by the data-processing apparatus 600 in accordance with instructions from operating module 651 and/or application module 652.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term "module" may also simply refer to an application such as a computer program design to assist in the performance of a specific task.

Application module 652 can include instructions such as the various operations described herein. More specifically, in one example, application module 652 can include a puzzle generator module or engine 690 and a puzzle captcha controller 691. As will be explained in more detail below with reference to non-limiting examples, puzzle generator module 690 is configured to generate a puzzle computational problem. Puzzle captcha controller 691 is configured to control various captcha operations, such as, receipt of captcha test requests from the user interface, rendering of the customized computational puzzle and comparison of user interfaced entered puzzle solution with a pre-determined correct solution to the puzzle problem to thereby determine if the user interface puzzle solution was generated by a human.

Software system 650 can include data bases 656, 657, libraries and other indexable or searchable data storage systems for storing puzzle features and results. Such databases and other storage system can be stored in storage/memory 604/602 which can be located locally or remotely from processor 601.

Figure 14:
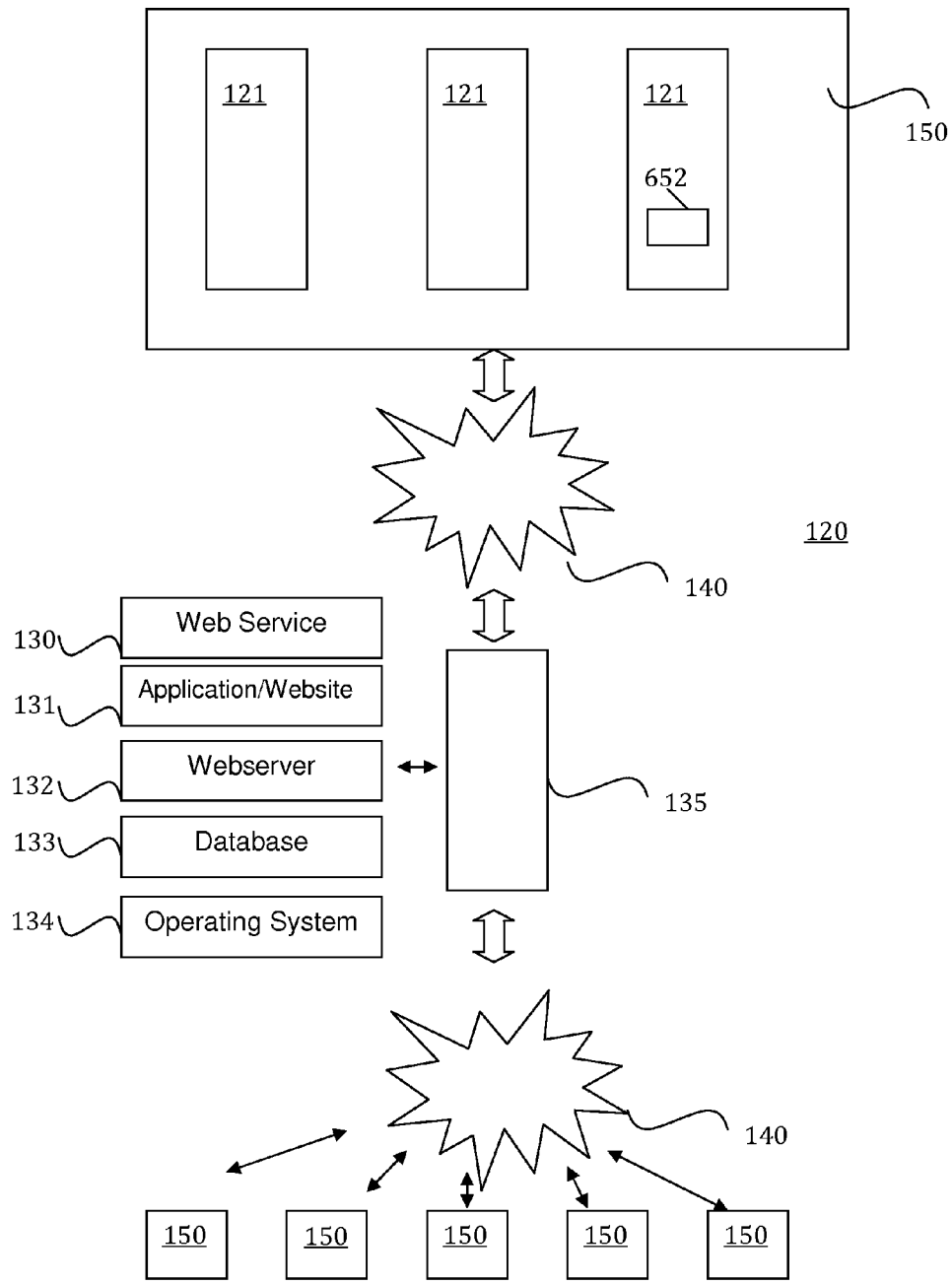
FIG. 14 is a schematic of a computer network environment for implementing methods of generating a Completely Automated Public Test to tell Computer and Humans Apart (CAPTCHA) according to embodiments.

User interface module 653, which is for example a graphical user interface (GUI), also serves to display results on the display device 606, whereupon the user may supply additional inputs or, for example, terminate a given session. Processor 601 can be connected to a user device including display device 606 and operating user interface module 653. The user device can be a local device or a remote device operably connectable via any suitable network to processor 601. By way of example, FIG. 14 illustrates one non-limiting example of a computer network system 120 for implementing methods of generating a Completely Automated Public Test to tell Computer and Humans Apart (CAPTCHA) according to the embodiments described herein. Computer network system 120 has one or more servers 121 on which is loadable software application 652 and which is remotely connectable to one or more user devices 150.

Client webserver 135 contains a puzzle captcha webservice 130 comprising software and other applications. For example, the puzzle captcha webservice 130 contains an application/website 131, database 133, and operating system 134. The client webserver 135 includes an application being protected from the computers pretending to be a human.

User device 150 is configurable to connect to the internet and interact with the puzzle captcha webservice 130. User device 150 enables a human to view the application/website 131 via a web browser or other application running on the user interface device. Any user device capable of running a web browser or other application that can access the application/website 131 over the internet may be utilized.

Figure 15:
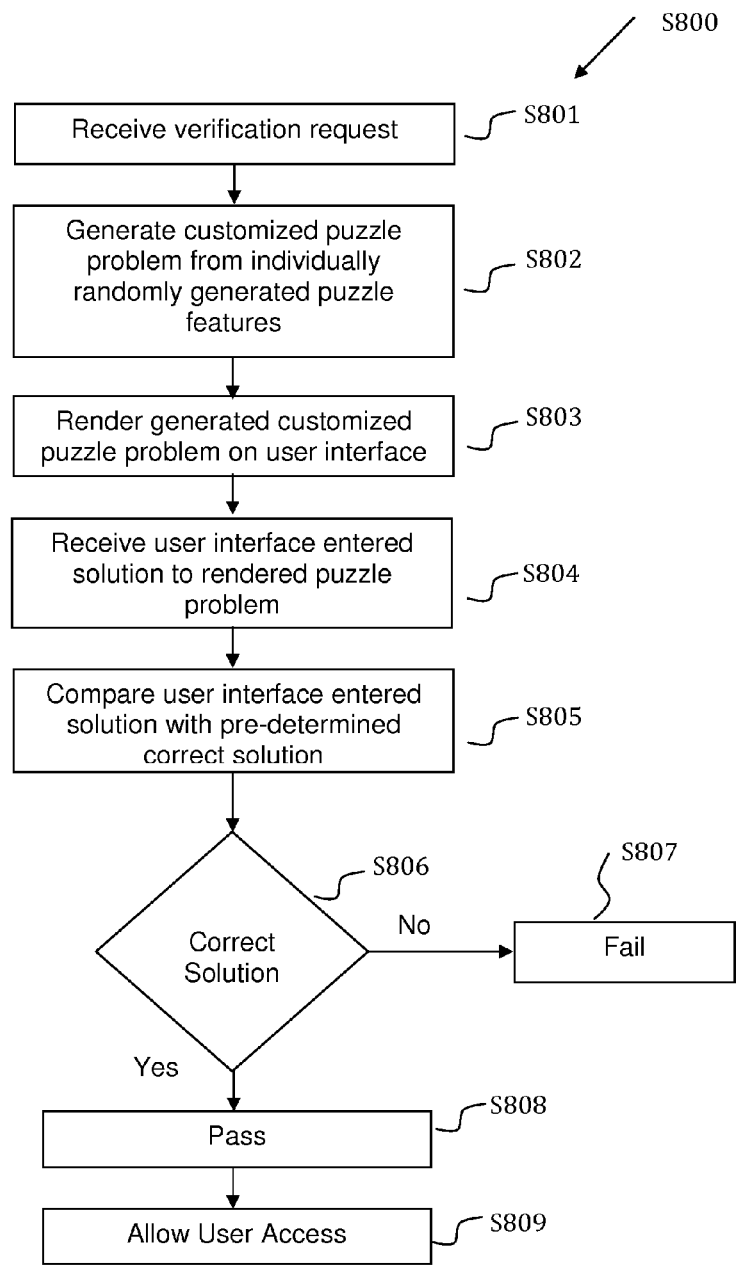
FIG. 15 illustrates a method of generating a Completely Automated Public Test to tell Computer and Humans Apart (CAPTCHA) according to one embodiment.

Implementations of methods of generating Completely Automated Public Test to tell Computer and Humans Apart (CAPTCHA) will now be described that provide particular puzzle solutions which a person can easily understand and solve but which a super computer cannot easily understand and the solutions of which cannot be easily "learnt". FIG. 15 illustrates a flow chart outlining a method S800 of generating Completely Automated Public Test to tell Computer and Humans Apart (CAPTCHA) according to one such implementation.

As indicated in FIG. 15, a computer system receives a request to determine if a computer user is a human or a machine (S801). A customized computational puzzle problem is generated from individually randomly generated puzzle features (S802). The generated computational puzzle problem is rendered on a user interface of the computer system (S803). A user interface entered solution to the rendered computational puzzle problem is then received by the computer system (S804). This is a result of a user entering the solution into the user interface. The computer accesses a pre-determined correct solution to the rendered computational puzzle problem that is expected to be determinable by a human rather than a computer (S805). The computer then compares the received user interface entered solution with the pre-determined correct solution (S806). The computer determines from the comparison of the received solution and the pre-determined correct puzzle solution that a human as opposed to a machine generated the user interface entered solution (S807). If the computer determines the user is a human, the system can move to a pass stage (S808) and allow the user interface to access protected software applications and/or data (S809). If the computer determines the user is a machine, the system moves to a fail stage (S807)

Puzzle features that are randomly generated by the puzzle generator engine for customizing the computational puzzle may be for example surface pattern, surface pictorial image, color gradient layer, water mark, puzzle component shape, and puzzle components layout.

Puzzle generator engine is configured to customize the puzzle problem on the fly by randomly generating individual components or features of the puzzle and then adding or combining features to provide the puzzle computational problem. For example, several static images can be provided on the backend of the system and they are not accessible by public users. When the system needs to produce a new puzzle captcha, the system can pull one of the images from the template and add another layer of a randomly selected color gradient on top of the image. After the new image is produced with the color gradient layer, the system can add a watermark in random coordinates to generate a final image.

Figure 16:
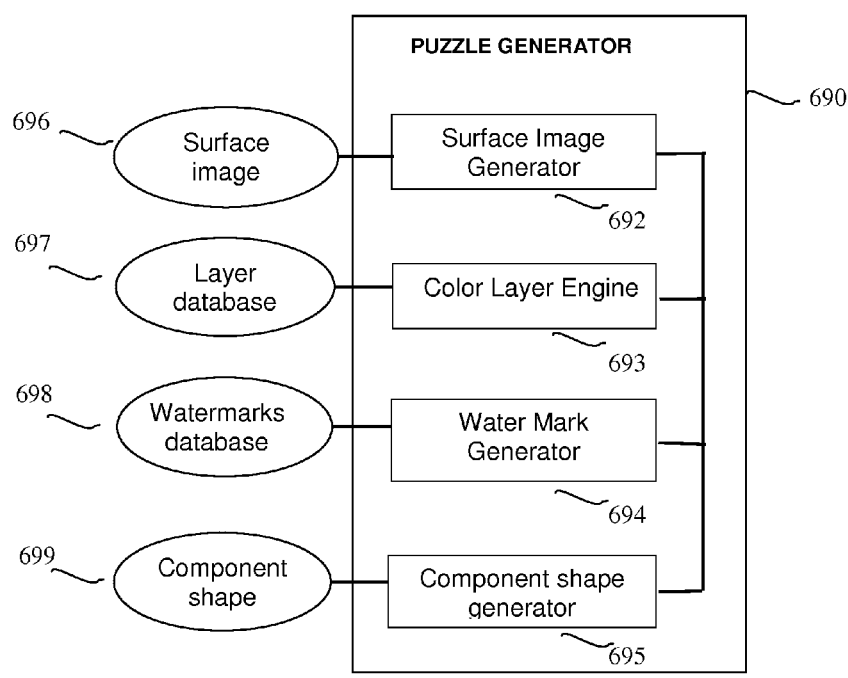
FIG. 16 is a schematic illustrating a puzzle generator module of the software system of FIG. 13 according to one embodiment.

By generating a customized computational puzzle problem from a plurality of individually randomly generated puzzle features, a super computer cannot easily "learn" the puzzle problem. FIG. 16 illustrates a non-limiting example of puzzle generator engine 690 for generating such customized computational puzzle problems. As shown in FIG. 16, the puzzle generator engine 690 includes the following sub modules: puzzle surface image generator 692; color layer engine 693; water mark generator 694; and shape generator 695. Puzzle generator 690 is configured to send/retrieve puzzle feature information from surface image database 696, color layer database 697, watermark database 698, shape database 699.

Figure 19:
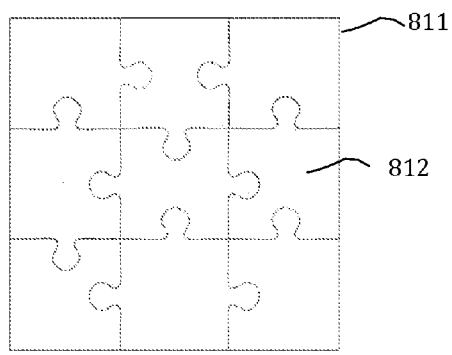
FIGS. 19-24 illustrate exemplary jigsaw puzzle features generated during the method of FIG. 18A to 18D.
Figure 20:
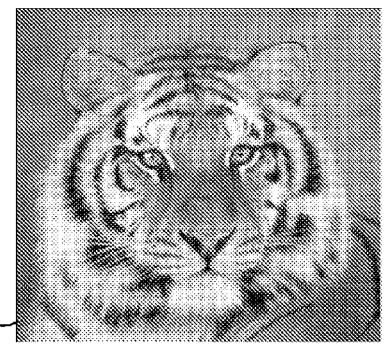
Figure 21:
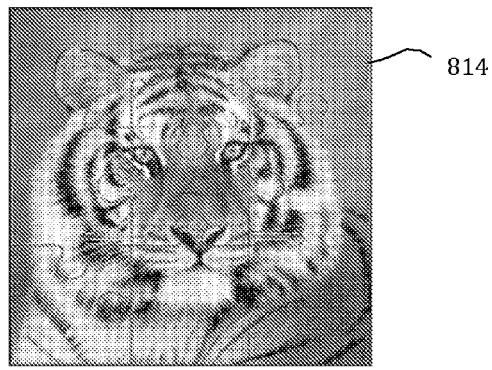

The process of generating a customized computational puzzle problem from a plurality of individually randomly generated puzzle features (process S802 of FIG. 25) will now be described in more detail according to one non-limiting example with reference to the flow chart of FIG. 17 and the puzzle generator of FIG. 16. The appropriate databases 696-699 hold or store data to assist in generation of the puzzle features and also store the data generated at each stage in the process. Initially, a puzzle surface image is randomly generated (S851). For example, surface image generator 692 randomly selects one or more puzzle images from images held in the image database 696. A color gradient layer is randomly generated (S852). Layer engine 693 generates the color layer or layers. The generated surface image and color layer gradient are combined (S853). Puzzle component shapes are randomly generated (S854) and applied to the combined image (S855). For example, in the case of a jigsaw puzzle, shape generator 695 can be configured to randomly generate a puzzle piece shape template which is applied to the combined image. Non-limiting examples of such a randomly generated puzzle piece template, puzzle combined image, and generated puzzle template applied to the combined image, are illustrated in FIGS. 19, 20 and 21, respectively. In the case of a maze, shape generator 695 is configured to randomly generator target shapes and/or maze pathways (see FIG. 25). A water mark is randomly generated and applied to the resulting puzzle image (S856). The final result is a customized computational puzzle which a super computer cannot easily learn.

The puzzle generator engine described may be used for a variety of puzzles. Many different graphical puzzle formats that may be adapted to the Puzzle Captcha system. Some may have a greater emphasis on shape, some color and some surface pattern. Some may have equal emphasis of all three: color, shape and pattern. The variation exists in the graphical representation and the instruction given to the user. The user is still required to go through the same visual and mental processes.

Non-limiting examples of particular types of puzzles and methods of generating Completely Automated Public Test to tell Computer and Humans Apart (CAPTCHA) employing such puzzles will now be described.

Figure 22:
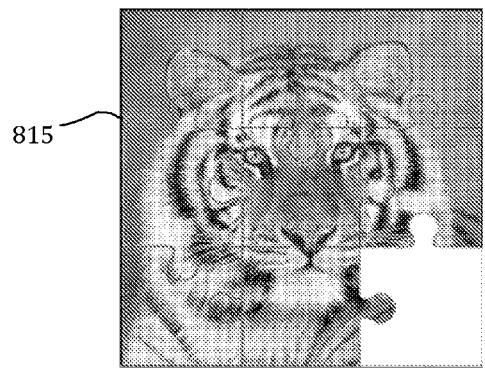
Figure 23:
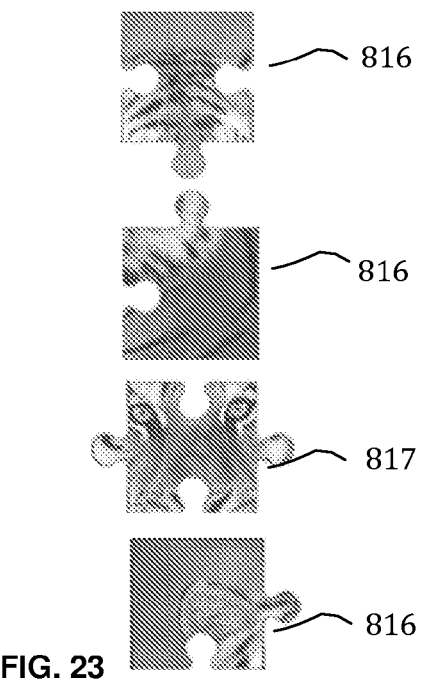
Figure 24:
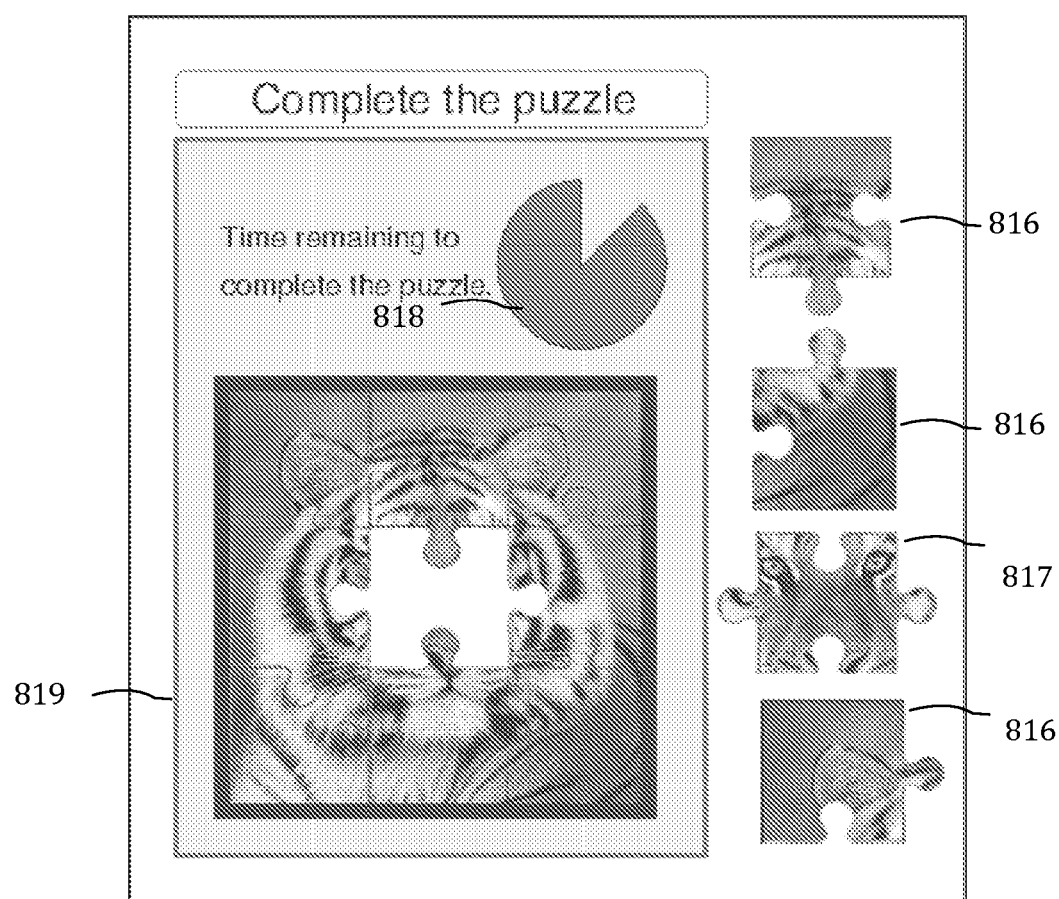

As already mentioned above, in one implementation, the puzzle is a jigsaw puzzle (see for example FIG. 20). The Puzzle Captcha system places substantially equal weight on color, shape and pattern to create a puzzle that is simple to solve for a human but extremely difficult to solve for a computer. As a general overview, an incomplete jigsaw puzzle is randomly generated (see for example FIG. 22). The incomplete jigsaw puzzle has one or more pieces missing. Solution pieces are also provided (see for example FIGS. 23 & 24). These provided solution pieces include the piece missing from the provided incomplete jigsaw puzzle. Solving skills required to solve the puzzle include (i) visually matching provided puzzle pieces (solution pieces) with the missing piece that forms part of those pieces that have been assembled; (ii) choosing the correct piece requires the user to interpret shape and surface patterns. The jigsaw puzzle solution pieces may include identical pieces with the correct solution shape but only one piece will have the correct image section.

The jigsaw puzzle can be formed from a particular puzzle template. Alternatively, the jigsaw puzzle can be a customized jigsaw puzzle generated from a plurality of individually randomly generated puzzle features using for example the methods and systems of FIGS. 16 and 17 described above. Such a customized jigsaw puzzle can be formed from layers will consist of a gradient, image colour and randomly generated puzzle outline. The puzzle generator uses binary code to generate the puzzle. The generated customized jigsaw puzzle can achieve enormous complexity for a computer to solve while keeping the task simple for a human. The jigsaw puzzle requires a super computer to resolve a solution and the solution cannot be learnt because the puzzle is randomly generated each time it is displayed. The picture and jigsaw outline change each time. Image analysis by a robot is further complicated due to the method we use to construct the image.

The difficulty of the jigsaw puzzle may be dramatically increased by including multiple correct solution shapes but only one shape has a correct image section. Also if there is more than one missing piece and only one solution this will increase the computation for a robot.

Figure 17:
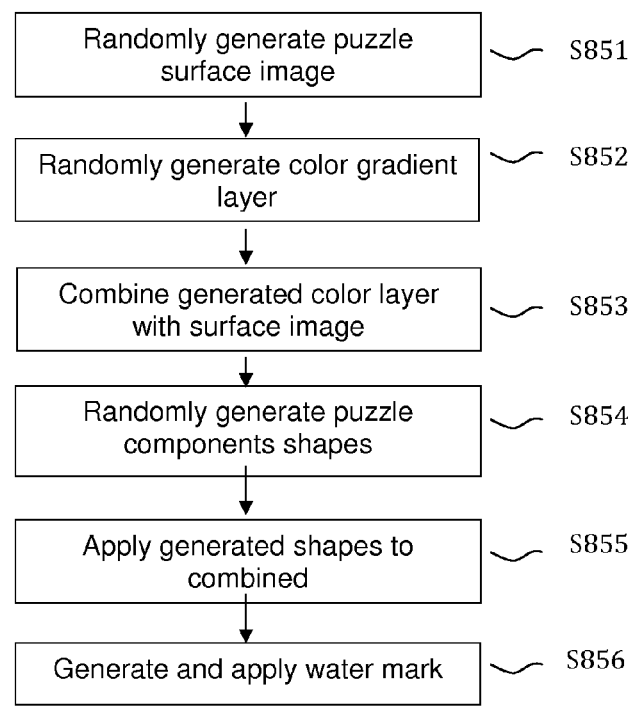
FIG. 17 is a flow chart illustrating in more detail the process of generating a customized computational puzzle problem of the method of FIG. 15, according to one embodiment.
Figure 18A:
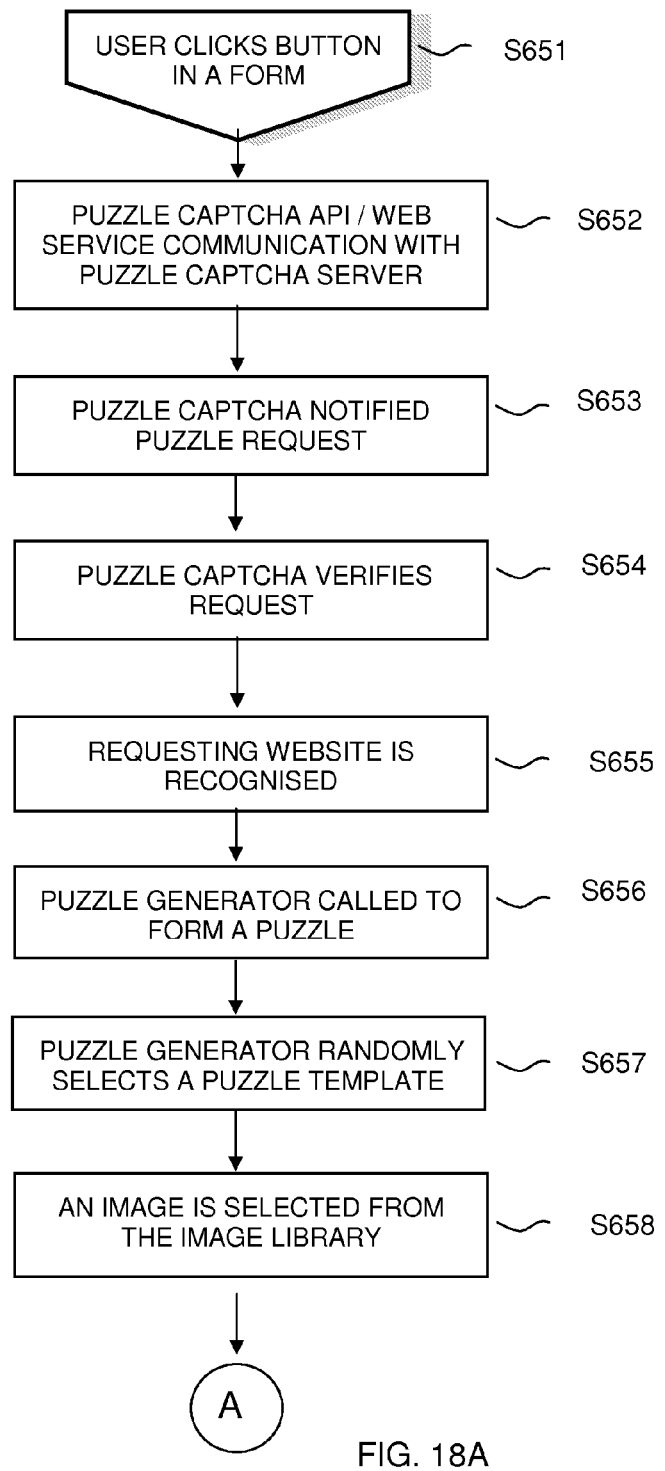
FIGS. 18A to 18D illustrate a flow chart of a method of generating a Completely Automated Public Test to tell Computer and Humans Apart (CAPTCHA) implemented in the computer network environment of FIG. 14 according to one embodiment.
Figure 18B:
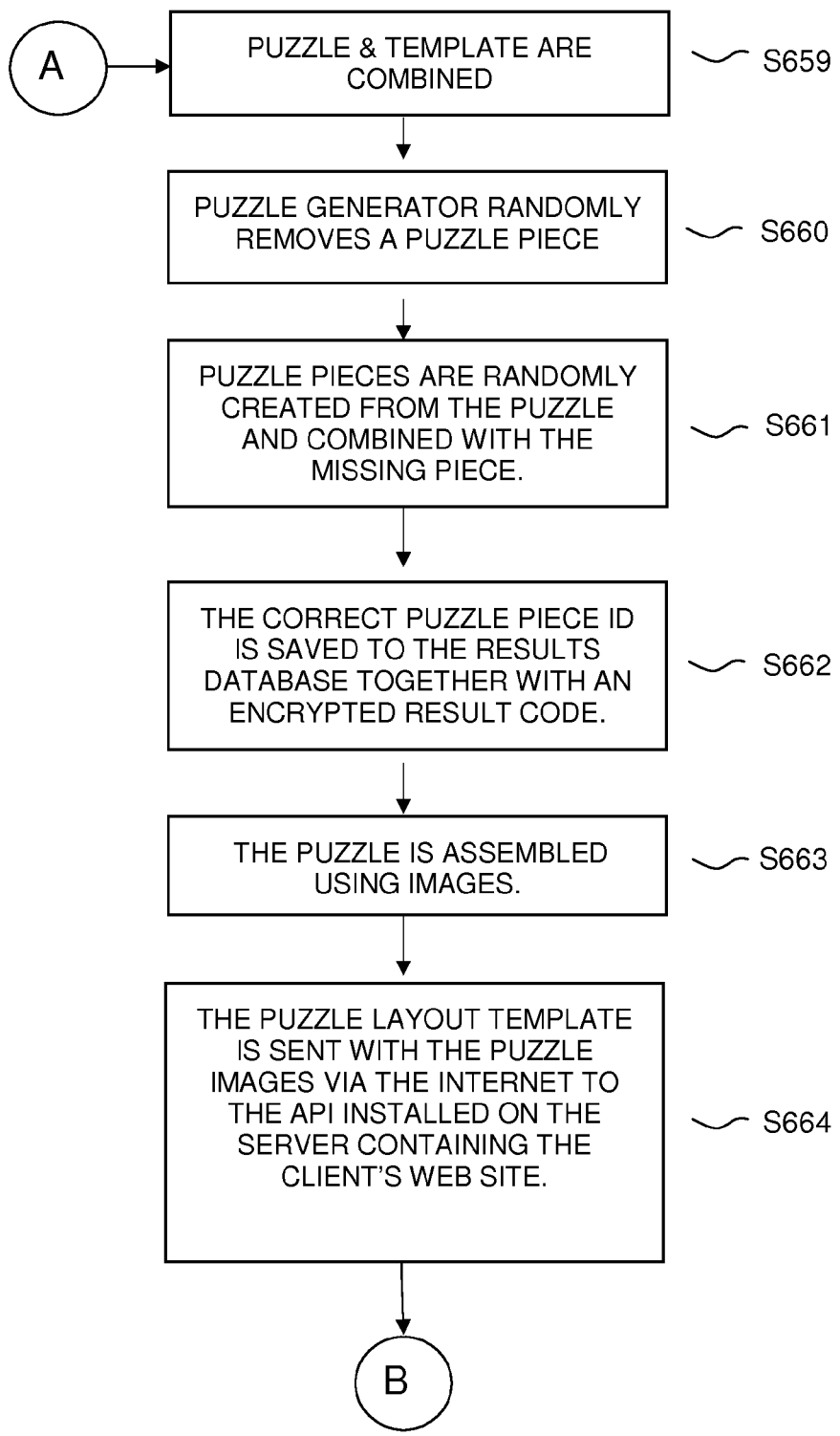
Figure 18C:
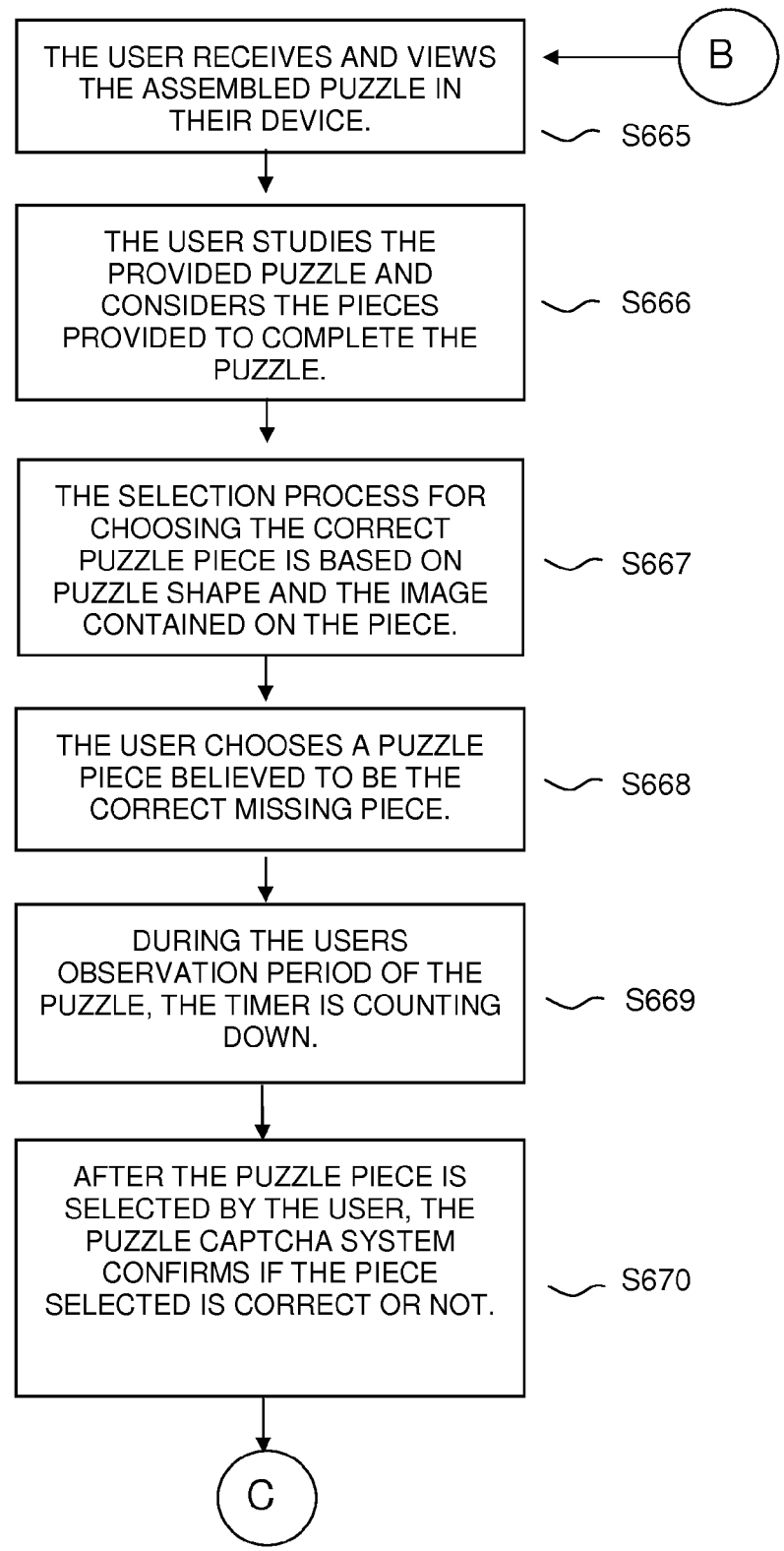
Figure 18D:
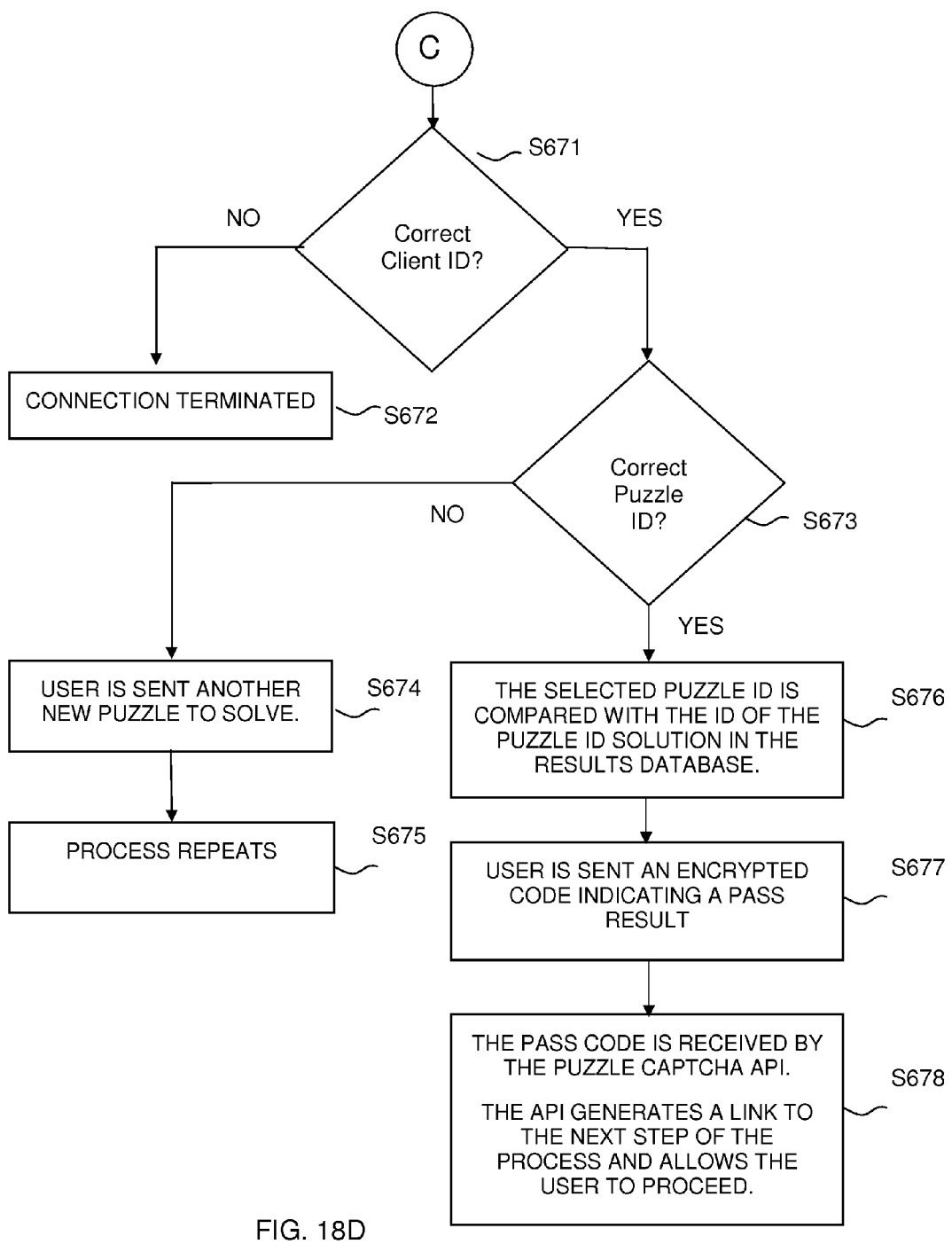

FIG. 17 is a flow chart illustrating in more detail a non-limiting example of a method of generating a jigsaw puzzle Completely Automated Public Test to tell Computer and Humans Apart (CAPTCHA). Whilst the method is implemented in the computer network of FIG. 14, the method can be implemented in other computer environments as discussed above.

Initially, a user operates user interface device to communicate with webservice by clicking button in a form (S651). Puzzle captcha webservice communicates with puzzle captcha server in response to receiving communication from user interface device (S652). Specifically, puzzle captcha/web service makes contact with the puzzle captcha server. The puzzle captcha server generates an encrypted id and sends it to the api. This id has a very short life and expires after 30 seconds. Puzzle captcha application on server receives a puzzle test request (S653). Specifically, puzzle captcha application is notified by the client website of a request for a puzzle to verify if the user is a human or machine. Puzzle captcha application verifies requesting site (S654). In order to verify the requesting site, the puzzle captcha application checks a data base of registered clients to verify if the requesting site is recognized. Assuming the requesting website is recognized (S656) a puzzle generator is requested to form a puzzle (S657). To this end, puzzle generator randomly selects a puzzle template. An image is selected from an image library (S658). Puzzle & template are combined (S659).

Puzzle generator randomly removes a puzzle piece (S660). Puzzle pieces are randomly created from the generated puzzle and combined with the missing piece (S661). The number of pieces provided to the user controls the odds of selecting the correct piece by luck. The correct puzzle piece id is saved to the results database together with an encrypted result code (S662). The result code is passed to the puzzle captcha application in the event the correct puzzle piece is chosen. As will be made apparent below, if the wrong puzzle piece is chosen a fail code is sent. The encrypted success code is changed each time the puzzle is loaded and each time a puzzle is created. Intercepting an encrypted puzzle code and re-using it will not produce a pass. The puzzle is assembled using images (S664). The puzzle layout template is sent with the puzzle images to the user interface device (S664).

In the system of FIG. 14, this is achieved by sending via the internet to the application installed on the server containing the client's web site and the user receiving and viewing the assembled puzzle in their user interface device (S665). The user interface device may be any hardware machine and the viewing may be done in any browser or other viewing application designed to receive the assembled puzzle components and the layout template. The user attempts to solve the missing piece puzzle problem. To this end, the user studies the provided puzzle and considers the pieces provided to complete the puzzle (S666).

The selection process for choosing the correct puzzle piece is based on puzzle shape and the image contained on the piece (S667). The puzzle piece options provided for the user to select from could include identical shapes but only one would have the correct image to complete the puzzle. Similarly the puzzle pieces provided for selection could all have the correct image but be of different shapes, with only one piece have the correct shape to complete the puzzle.

The user chooses a puzzle piece believed to be the correct missing piece (S669). The choosing action can be for example performed by clicking on the piece with the cursor controlled by the mouse or other pointing device of the user interface. If the user is viewing the puzzle captcha puzzle on a user interface with a touch sensitive screen, the choosing action can be performed by user tapping the correct puzzle piece with their finger or other device such as a stylus. If the user is using a mobile phone or other viewing device as a user interface where a pointing device is not present but a joystick or toggle control is supplied, the choosing action can be performed by operator navigates to the correct puzzle piece and selects the piece.

During the user's observation period of the puzzle, the timer is counting down (S668). At the end of the count down time period the puzzle is removed from view and a new puzzle is provided to the user. The fixed time period for considering and choosing a puzzle piece increases the amount of computing power required by a fraudulent computer pretending to be a human user solving the puzzle problem.

After the puzzle piece is selected by the user, the puzzle captcha system confirms if the piece selected is correct or not. The id of the selected puzzle piece is sent from the user to the puzzle captcha system where the identify of the puzzle captcha client is verified (S671). If the client is known, the puzzle captcha results database is contacted by the puzzle captcha main system. Only the main system has the permission to connect with the results data base. If incorrect client id is determined the connection terminated (S672). If correct client id is determined (S671), the selected puzzle piece ID is compared with the correct puzzle solution ID in the data base (S673). If the selected puzzle piece ID is correct (S674), user is sent an encrypted code indicating a pass result (S675). If the selected puzzle piece ID is incorrect, user is sent another new puzzle to solve (S676). Processes S656 to S674 repeat. The puzzle captcha application receives the encypted pass code and allows user interface to access software/applications being protected from computers pretending to be humans. This software/application can for example be stored on the client webserver and accessed via a link generated sent to the user interface by the puzzle captcha application.

Figure 25:
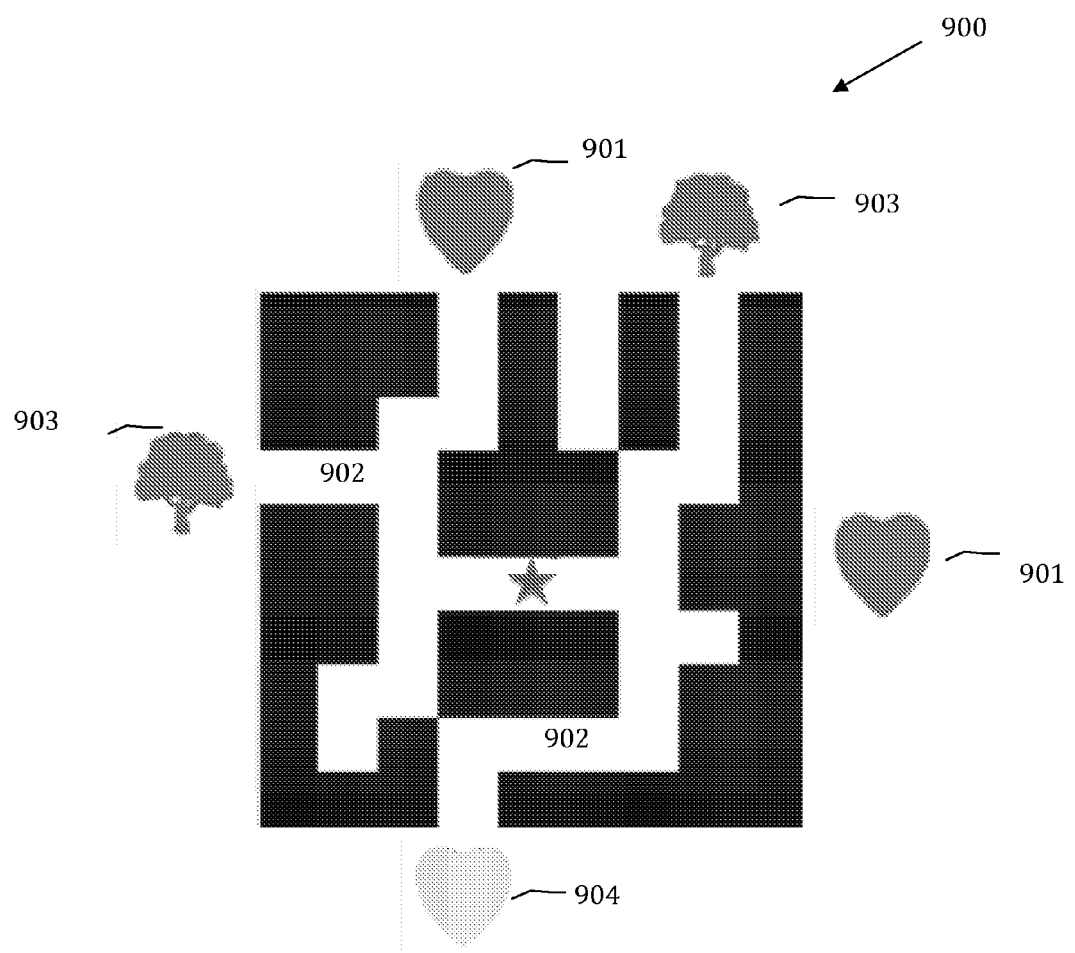
FIG. 25 illustrates a computational puzzle according to another embodiment.

In another example, the puzzle is a maze for example as shown in FIG. 25. The maze can have multiple exits but only one exit is correct. The maze computational puzzle problem can be generated from a plurality of individually randomly generated puzzle graphical features. To this end, one or more pathways 902 are generated leading to an exit of the maze. A plurality of shaped targets 901, 903, 904 are randomly generated and one of the generated shaped targets is associated with the exit. The correction solution comprises exiting the maze to reach a correct exit target. In the non-limiting example of the maze of FIG. 25, rendered instructions would read: Exit the maze to find the green hart 901. In the case of the maze we have the requirement to correctly resolve: The shape of the targets: green harts 901, green trees 903, blue hart 904; Correctly resolve direction through the maze to reach the correct target.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The invention claimed is:

1. A method of generating a Completely Automated Public Test to tell Computer and Humans Apart (CAPTCHA), the method comprising:

receiving in a computer a request for a test to determine if a user is a machine or a human;

providing, using said computer according to said received request, a computational puzzle comprising an unfinished jigsaw puzzle having at least one missing jigsaw puzzle piece and solution pieces for selection, said solution pieces comprising said at least one jigsaw piece missing from said unfinished jigsaw puzzle and at least one incorrect solution piece, said provided computational puzzle having a correct solution that is expected to be determinable by a human rather than a computer;

rendering said generated computational unfinished jigsaw puzzle on a user interface operatively connected to said computer;

rendering, on said user interface, solution pieces for selection, said solution pieces comprising said at least one jigsaw piece missing from said unfinished jigsaw puzzle and at least one incorrect solution piece;

receiving in said computer a selection of at least one of said solutions pieces as a solution for finishing said unfinished jigsaw puzzle;

accessing, using said computer, a pre-stored correct at least one jigsaw puzzle solution piece missing from said unfinished jigsaw puzzle that is expected to be determinable by a human rather than a computer;

comparing, using said computer, said received solution to said pre-stored correct at least one jigsaw puzzle solution piece missing from said unfinished jigsaw puzzle;

determining, using said computer, that a human as opposed to a machine solved said computational unfinished jigsaw puzzle, if said received selected at least one solution piece corresponds to said correct at least one jigsaw puzzle piece missing from said unfinished jigsaw puzzle; and using said computer to allow said user interface to access protected software applications and/or data in response to determining that a human opposed to a machine solved said computational unfinished jigsaw puzzle.

2. The method of claim 1, wherein said rendered solution pieces comprise a correct solution piece having the correct image and shape of a missing piece and wherein said other solution pieces have correct shapes of said missing piece but incorrect images.

3. The method of claim 2, wherein providing said computational puzzle further comprises generating said unfinished jigsaw puzzle and solution pieces from a plurality of individually randomly generated puzzle features.

4. The method of claim 3, wherein generating said unfinished jigsaw puzzle and solution pieces from a plurality of individually randomly generated puzzle features further comprises forming said unfinished jigsaw puzzle and solution pieces from layers of a gradient, image color and randomly generated puzzle outline.

5. The method of claim 1, wherein providing said computational puzzle further comprises generating, utilizing binary code, said unfinished jigsaw puzzle and solution pieces.

6. A method for generating a Completely Automated Public Test to tell Computer and Humans Apart (CAPTCHA), the method comprising:

receiving in a computer a request to determine if a user is a human or a machine;

generating, using said computer, a customized computational puzzle problem from individually randomly generated puzzle features, wherein generating a customized computational puzzle problem from individually randomly generated puzzle features comprises:

generating, from individually randomly generated puzzle features, an unfinished jigsaw puzzle having at least one missing jigsaw puzzle piece, and generating a plurality of puzzle pieces for selection, wherein generating said plurality of puzzle pieces for selection comprises generating at least one correct solution piece missing from said unfinished jigsaw puzzle and at least one incorrect jigsaw puzzle piece;

rendering said generated computational puzzle problem on a user interface operatively connected to said computer, wherein rendering said generated computational puzzle problem on the user interface operatively connected to said computer system comprises rendering said generated unfinished jigsaw puzzle and said generated plurality of puzzle pieces for selection on said user interface;

receiving in said computer a user interface entered solution to said rendered computational puzzle problem, wherein receiving in said computer a user interface entered solution to said rendered computational puzzle problem comprises receiving a user interface entered selection of at least one of said rendered plurality of jigsaw puzzle pieces as a solution for finishing said jigsaw puzzle;

accessing, using said computer, a pre-determined correct at least one jigsaw puzzle solution piece missing from said unfinished jigsaw puzzle as a solution to said rendered computational puzzle problem that is expected to be determinable by a human rather than a computer;

comparing, using said computer, said received solution with said pre-determined correct at least one jigsaw solution piece missing from said unfinished jigsaw puzzle;

determining from said comparison of said received solution and said pre-determined correct at least one missing jigsaw puzzle solution piece that a human as opposed to a machine generated said user interface entered solution.

7. The method of claim 6, wherein generating said plurality of jigsaw puzzle pieces for selection further comprises generating a plurality of different shaped puzzle pieces for selection.

8. The method of claim 6, wherein generating said plurality of jigsaw puzzle pieces for selection further comprises generating at least one incorrect puzzle piece having a shape substantially identical to said at least one missing jigsaw puzzle and having a puzzle image different from the puzzle image of said at least one missing piece.

9. The method of claim 6, wherein generating, from individually randomly generated puzzle features, an unfinished jigsaw puzzle having at least one missing jigsaw puzzle piece, comprises randomly generating a jigsaw puzzle image;
randomly generating jigsaw puzzle piece template;
combining said generated jigsaw piece template and said jigsaw image to generate a finished jigsaw puzzle;
removing at least one puzzle piece from said finished jigsaw puzzle to form an unfinished jigsaw puzzle; and
wherein generating at least one correct solution piece missing from said unfinished jigsaw puzzle includes
storing said at least one missing jigsaw puzzle piece as a correct solution for completing said unfinished jigsaw puzzle.

10. The method of claim 9, wherein generating a customized computational puzzle problem from individually randomly generated puzzle features further comprises;

randomly generating a color gradient layer; and
including said randomly generated color gradient layer in said finished jigsaw puzzle image.

11. The method of claim 9, wherein generating a customized computational puzzle problem from individually randomly generated puzzle features further comprises randomly generating a water mark; and including said randomly generated color water mark in an image of said jigsaw puzzle.

12. A system for generating a Completely Automated Public Test to tell Computer and Humans Apart (CAPTCHA), the system comprising:

processor;

a data bus coupled to said processor; and a computer usable non-transitory storage medium embodying computer program code, said computer usable medium being coupled to said data bus; and said computer program code comprising instructions executable by said processor and configured to:

receive a request to determine if a user is a human or a machine;

generate an unfinished jigsaw puzzle having at least one missing jigsaw puzzle piece;

generate a plurality of puzzle pieces for selection, wherein said plurality of puzzle pieces for selection comprises at least one correct solution piece missing from said unfinished jigsaw puzzle and at least one incorrect jigsaw puzzle piece;

render said generated unfinished jigsaw puzzle and said generated plurality of puzzle pieces for selection on said user interface;

receive a user interface entered selection of at least one of said rendered plurality of jigsaw puzzle pieces as a solution for finishing said jigsaw puzzle;

access a pre-determined correct at least one jigsaw puzzle solution piece missing from said unfinished jigsaw puzzle as a solution to said rendered computational puzzle problem that is expected to be determinable by a human rather than a computer;

compare said received solution with said pre-determined correct solution;

determine from said comparison of said received solution and said pre-determined correct at least one missing jigsaw puzzle piece solution that a human as opposed to a machine generated said user interface entered solution.

13. The system of claim 12, further comprising instructions executable by said processor and configured to:

generate at least one incorrect puzzle piece having a shape substantially identical to said at least one missing jigsaw puzzle and having a puzzle image different from the puzzle image of said at least one missing piece.

14. The method of claim 6 further comprising randomly generating a plurality of selectable jigsaw puzzle pieces as possible solutions for completing said unfinished puzzle, wherein said generated plurality of jigsaw puzzle pieces includes said at least one missing puzzle piece.

15. The method of claim 6 further comprising wherein receiving in said computer a user interface entered solution to said rendered computational jigsaw puzzle problem comprises receiving in said computer in a defined amount of time from rendering said generated computational puzzle problem a user interface entered selection of at least one jigsaw puzzle piece from said plurality of selectable jigsaw puzzle pieces as solution for completing said unfinished jigsaw puzzle.

* * * * *